(12) United States Patent
Isobe et al.

(10) Patent No.: US 11,187,279 B2
(45) Date of Patent: Nov. 30, 2021

(54) CLUTCH DEVICE

(71) Applicant: Kabushiki Kaisha F.C.C., Hamamatsu (JP)

(72) Inventors: Kenichiro Isobe, Shizuoka (JP); Kenichiro Takahashi, Shizuoka (JP); Katsu Yoshimoto, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 16/966,699

(22) PCT Filed: Feb. 27, 2019

(86) PCT No.: PCT/JP2019/007474
§ 371 (c)(1),
(2) Date: Jul. 31, 2020

(87) PCT Pub. No.: WO2019/176537
PCT Pub. Date: Sep. 19, 2019

(65) Prior Publication Data
US 2021/0033154 A1 Feb. 4, 2021

(30) Foreign Application Priority Data
Mar. 16, 2018 (JP) .............................. JP2018-048909

(51) Int. Cl.
*F16D 13/56* (2006.01)
*F16D 13/54* (2006.01)
*F16D 13/70* (2006.01)

(52) U.S. Cl.
CPC ............. *F16D 13/54* (2013.01); *F16D 13/70* (2013.01); *F16D 2013/565* (2013.01)

(58) Field of Classification Search
CPC ...... F16D 13/52–2013/565; F16D 43/213–216
See application file for complete search history.

(56) References Cited

U.S. PATENT DOCUMENTS 6,626,278 B2 * 9/2003 Sugita .................... F16D 13/52
192/70.27
10,047,803 B2 * 8/2018 Yoshimoto ............. F16D 43/12
(Continued)

FOREIGN PATENT DOCUMENTS

JP 64-58816 A 3/1989
JP 2008-39082 A 2/2008
(Continued)

OTHER PUBLICATIONS

International Search Report (ISR) dated May 21, 2019 filed in PCT/JP2019/007474.

*Primary Examiner* — David R Morris
(74) *Attorney, Agent, or Firm* — Rankin, Hill & Clark LLP

(57) ABSTRACT

Provided is a clutch device configured so that close contactability between a cam surface of a center clutch and a cam surface of a pressure clutch can be improved and torque transmission can be stabilized accordingly. The clutch device (100) includes a center clutch (105) and a pressure clutch (112). The center clutch (105) includes center-side cam portions (107), a pressure clutch slide portion (106), and a lifter plate slide portion (110). The pressure clutch (112) includes pressure-side cam portions (114), a lifter plate (116), and a second center clutch slide portion (113). The lifter plate (116) includes first center clutch slide portions (120). A clearance (C2) between the second center clutch slide portion (113) and the pressure clutch slide portion (106) is set greater than a clearance (C1) between the first center clutch slide portion (120) and the lifter plate slide portion (110).

5 Claims, 8 Drawing Sheets

(56) References Cited

U.S. PATENT DOCUMENTS

| | | | |
|---|---|---|---|
| 10,781,865 B2* | 9/2020 | Isobe | F16D 13/54 |
| 10,801,554 B2* | 10/2020 | Ito | F16D 13/56 |
| 10,895,287 B2* | 1/2021 | Imanishi | F16D 13/52 |
| 2002/0170798 A1* | 11/2002 | Sugita | F16D 13/76 |
| | | | 192/70.27 |
| 2015/0337910 A1 | 11/2015 | Yoshimoto et al. | |
| 2019/0017554 A1 | 1/2019 | Isobe et al. | |
| 2019/0211886 A1* | 7/2019 | Ito | F16D 13/70 |
| 2019/0285125 A1* | 9/2019 | Imanishi | F16D 13/52 |
| 2020/0292010 A1* | 9/2020 | Kobayashi | F16D 13/56 |

FOREIGN PATENT DOCUMENTS

| | | |
|---|---|---|
| JP | 2017-62048 A | 3/2017 |
| JP | 2017-133530 A | 8/2017 |

* cited by examiner (A)

(B)

CLUTCH DEVICE

TECHNICAL FIELD

The present invention relates to a clutch device configured to transmit rotary drive force of a drive shaft to be rotatably driven by a motor to a driven shaft configured to drive a drive target body or block such transmission.

BACKGROUND ART

Typically, in a vehicle such as a two-wheel motor vehicle or a four-wheel motor vehicle, a clutch device has been used to transmit rotary drive force of a motor to a drive target body or block such transmission, and is arranged between the motor such as an engine and the drive target body such as a wheel. Generally, in the clutch device, multiple friction plates to be rotated by the rotary drive force of the motor and multiple clutch plates coupled to the drive target body are arranged facing each other, and transmission or blocking of the rotary drive force can be performed as necessary by close contact or separation of the friction plates and the clutch plates.

For example, Patent Literature 1 below discloses a clutch device including cam surfaces for quickly performing transmission or blocking of rotary drive force, and these cam surfaces are provided at opposing surfaces of a clutch member (a center clutch) and a pressure member (a pressure clutch) approaching each other or separating from each other with clutch plates being held. This clutch device is configured such that the clutch member and the pressure member quickly approach each other by assist torque. Such assist torque is generated when three cam surfaces formed at the pressure member move over three cam surfaces formed at the clutch member in a state in which the pressure member has slid in each of a rotation direction and an axial direction relative to the clutch member.

CITATION LIST

Patent Literature

Patent Literature 1: JP-A-2017-133530

However, the clutch device described in Patent Literature 1 above is configured such that three pairs of cam surfaces simultaneously slide on each other in such a manner that the pressure member is fitted onto a cylindrical portion formed at a center portion of the clutch member to slide on the cylindrical portion in the axial direction. Thus, in a case where fitting accuracy between the pressure member and the clutch member is low, tilting of the opposing cam surfaces is caused, and for this reason, it is difficult to stably generate sufficient thrust force. Thus, in the typical clutch device, there is a problem that torque transmission between the motor and the drive target body is unstable.

The present invention has been made to address the above-described problem. An object of the present invention is to provide the following clutch device. The clutch device is configured so that close contactability between a cam surface of a center clutch and a cam surface of a pressure clutch can be improved and torque transmission can be stabilized accordingly.

SUMMARY OF INVENTION

In order to achieve the above object, a feature of the present invention resides in a clutch device for transmitting rotary drive force of a drive shaft to a driven shaft or blocking transmission, the clutch device including: a center clutch holding a clutch plate arranged facing a friction plate to be rotatably driven by rotary drive of the drive shaft, coupled to the driven shaft, and rotatably driven together with the driven shaft; and a pressure clutch arranged facing the center clutch in a state in which the pressure clutch is able to approach or separate from the center clutch and is rotatable relative to the center clutch and elastically pressing the friction plate or the clutch plate; a cam portion provided at each of the center clutch and the pressure clutch and having a pair of cam surfaces for causing the pressure clutch to approach or separate from the center clutch to increase or decrease pressing force of the pressure clutch on the friction plate or the clutch plate upon relative rotation of the center clutch and the pressure clutch; and a lifter plate formed integrally with the pressure clutch and configured to transmit, to the pressure clutch, force of causing the pressure clutch to approach or separate from the center clutch, wherein the center clutch has each of a pressure clutch slide portion formed in a cylindrical shape on a cam surface formation side in an axial direction of the driven shaft and configured to slide the pressure clutch along the axial direction and a lifter plate slide portion formed in a cylindrical shape on a side opposite to a pressure clutch slide portion formation side in the axial direction and configured to slide the lifter plate along the axial direction, the lifter plate has a first center clutch slide portion configured to slide on the lifter plate slide portion, the pressure clutch has a second center clutch slide portion configured to slide on the pressure clutch slide portion, and a clearance between the second center clutch slide portion and the pressure clutch slide portion is set to a greater value than a clearance between the first center clutch slide portion and the lifter plate slide portion.

In this case, the cam surfaces include an assist cam surface and a slipper cam surface. In the case of the assist cam surface, when the pressure clutch approaches the center clutch, the cam surface formed at the pressure clutch moves over the cam surface formed at the center clutch, and accordingly, the force of causing the pressure clutch to approach the center clutch is increased. In the case of the slipper cam surface, when the pressure clutch separates from the center clutch, the cam surface formed at the pressure clutch moves over the cam surface formed at the center clutch, and accordingly, the force of separating the pressure clutch is increased. Thus, the cam portion in the present invention includes at least one of a pair of assist cam surfaces or a pair of slipper cam surfaces.

According to the feature of the present invention configured as described above, in the clutch device, the clearance between the second center clutch slide portion and the pressure clutch slide portion sliding on each other in the vicinity of the cam surfaces is set to a greater value than the clearance between the first center clutch slide portion and the lifter plate slide portion sliding on each other at a position apart from the cam surfaces. Thus, in the clutch device, the first center clutch slide portion slides on the lifter plate slide portion. Consequently, the pressure clutch can be guided on the same axis as that of the center clutch, a change in tilting of the pressure clutch can be accepted by the clearance between the second center clutch slide portion and the pressure clutch slide portion, and the cam surfaces of the pressure clutch can slide in close contact with the cam surfaces of the center clutch. With this configuration, the clutch device can improve close contactability between the cam surface of the center clutch and the cam surface of the pressure clutch, and can stabilize torque transmission.

Moreover, another feature of the present invention is that in the clutch device, the lifter plate slide portion is formed at an inner surface of a plate holding portion in a radial direction, the plate holding portion being formed in a cylindrical shape at the center clutch and holding the clutch plate.

According to another feature of the present invention configured as described above, in the clutch device, the lifter plate slide portion is formed at the inner surface of the relatively-thin cylindrical clutch plate holding portion in the radial direction, the clutch plate holding portion holding the clutch plate of the center clutch. Thus, slide heat between the lifter plate slide portion and the first center clutch slide portion sliding on each other through a narrow clearance can be effectively cooled by a cooling medium such as gas (e.g., air) or liquid (e.g., clutch oil) for air-cooling or oil-cooling the clutch plate and the friction plate.

Moreover, still another feature of the present invention is that in the clutch device, the center clutch has a plate receiving portion which is formed to project outwardly in a radial direction from a tip end portion of a plate holding portion formed in a cylindrical shape at the center clutch and holding the clutch plate and which is configured to receive the friction plate or the clutch plate pressed by the pressure clutch, and the lifter plate slide portion is formed at an inner surface of the plate receiving portion in the radial direction.

According to still another feature of the present invention configured as described above, in the clutch device, the lifter plate slide portion is formed at the inner surface of the thick plate receiving portion in the radial direction, the plate receiving portion being formed at the center clutch to project in the radial direction. Thus, the center clutch can stably guide the lifter plate fitted in a narrow clearance.

In addition, still another feature of the present invention is that in the clutch device, the first center clutch slide portion is formed such that a length in the axial direction of the driven shaft is longer than that of the second center clutch slide portion.

According to still another feature of the present invention configured as described above, the clutch device is formed such that the length of the first center clutch slide portion in the axial direction of the driven shaft is longer than that of the second center clutch slide portion. Thus, the pressure clutch can reciprocatably slide, with favorable accuracy, in the axial direction of the center clutch.

Note that a longer length of the first center clutch slide portion in the axial direction of the driven shaft than that of the second center clutch slide portion means that the length of contact of the first center clutch slide portion with the lifter plate slide portion in the axial direction is longer than the length of contact of the second center clutch slide portion with the pressure clutch slide portion in the axial direction. Moreover, the clutch device may be formed such that the length of the first center clutch slide portion in the axial direction of the driven shaft is shorter than that of the second center clutch slide portion. With this configuration, the acceptable amount of tilting of the pressure clutch can be increased.

Moreover, still another feature of the present invention is that in the clutch device, the second center clutch slide portion is formed at a position overlapping with the cam portion in the axial direction of the driven shaft.

According to still another feature of the present invention configured as described above, in the clutch device, the second center clutch slide portion is formed at the position overlapping with the cam portion in the axial direction of the driven shaft. Thus, the amount of tilting of the pressure clutch can be easily defined by the clearance between the second center clutch slide portion and the pressure clutch slide portion.

Note that in the clutch device, the second center clutch slide portion may be also formed at a position not overlapping with the cam portion on the side opposite to a first center clutch slide portion side in the axial direction of the driven shaft. According to such a configuration, in the clutch device, a distance between the first center clutch slide portion and the second center clutch slide portion is further increased. Thus, the amount of tilting of the pressure clutch can be more finely defined, and therefore, can be easily defined with high accuracy.

DESCRIPTION OF EMBODIMENTS

Figure 1:
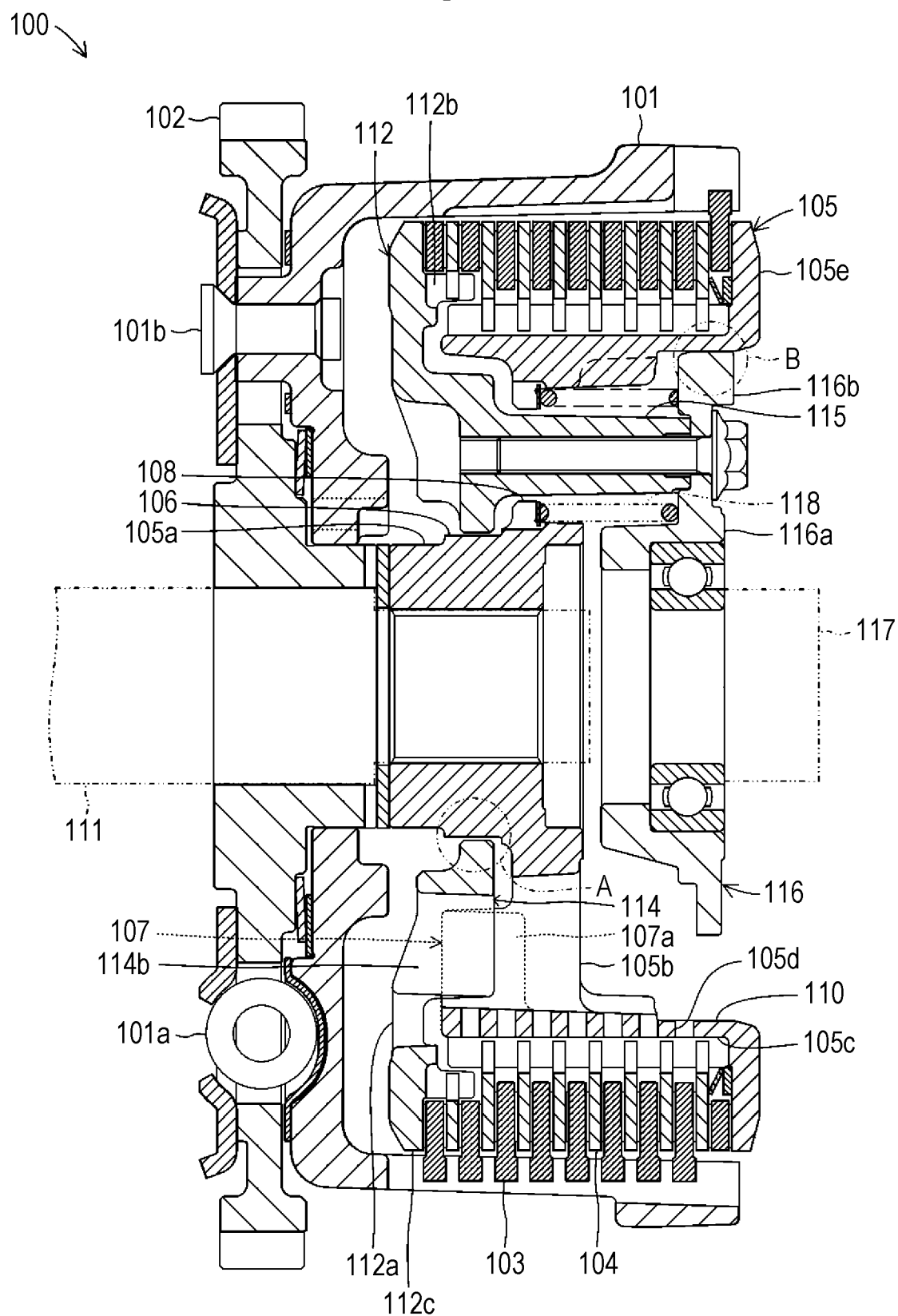
FIG. 1 is a sectional view illustrating the outline of an entire configuration of a clutch device according to one embodiment of the present invention, the clutch device being in a clutch ON state.

Hereinafter, one embodiment of a clutch device according to the present invention will be described with reference to the drawings. FIG. 1 is a sectional view illustrating the outline of an entire configuration of a clutch device 100 according to the present invention. Note that for the sake of easy understanding of the present invention, each figure referred to in the present specification is schematically illustrated. For example, some components are exaggeratingly illustrated. For this reason, dimensions and ratios among the components might vary. The clutch device 100 is a mechanical device for transmitting drive force of an engine (not shown) as a motor in a two-wheel motor vehicle (a motorcycle) to a wheel (not shown) as a drive target body or blocking such transmission, and is arranged between such an engine and a transmission (not shown).

Configuration of Clutch Device 100

The clutch device 100 includes a clutch housing 101. The clutch housing 101 is a component for holding friction plates 103 and transmitting the drive force from the engine to the friction plates 103. The clutch housing 101 is formed in such a manner that an aluminum alloy material is shaped into a bottomed cylindrical shape. More specifically, an internal-gear-shaped spline is formed at a tubular portion of the clutch housing 101. The multiple (nine in the present embodiment) friction plates 103 are spline-fitted in and held on the spline in a state in which the friction plates 103 are displaceable along an axis line direction of the clutch housing 101 and are rotatable integrally with the clutch housing 101.

In the clutch housing 101, a left side surface thereof as viewed in the figure is attached to an input gear 102 with a rivet 101b through a torque damper 101a. The input gear 102 is a gear component to be rotatably driven with the input gear 102 engaging with a drive gear coupled to a not-shown drive shaft to be rotatably driven by drive of the engine. The input gear 102 is rotatably supported on a later-described shaft 111 through a bearing (not shown). That is, the clutch housing 101 is, at a position concentric with the shaft 111, integrally rotatably driven with the input gear 102 independently of the shaft 111.

The friction plate 103 is a flat plate annular component to be pressed against a clutch plate 104. The friction plate 103 is formed in such a manner that a thin plate member made of an aluminum material is shaped into an annular shape. In this case, external teeth configured to engage with the internal-tooth-shaped spline of the clutch housing 101 are formed at an outer peripheral portion of each friction plate 103. Not-shown friction members including multiple pieces of paper are each bonded to both side surfaces (front and back surfaces) of each friction plate 103, and a not-shown oil groove is formed between these friction members. Moreover, the friction plates 103 are formed to have the same size and shape for a center clutch 105 and a pressure clutch 112 provided inside the clutch housing 101.

In the clutch housing 101, the multiple (eight in the present embodiment) clutch plates 104 are held on the center clutch 105 and the pressure clutch 112 with each clutch plate 104 being sandwiched by corresponding ones of the friction plates 103. The clutch plate 104 is a flat plate annular component to be pressed against the friction plate 103. The clutch plate 104 is shaped in such a manner that a thin plate member made of a SPCC (cold rolled steel plate) material is punched into an annular shape. Not-shown oil grooves formed for holding clutch oil and having a depth of several µm to several tens of µm are each formed at both side surfaces (front and back surfaces) of each clutch plate 104, and surface hardening treatment is performed for each of these surfaces for the purpose of improving abrasion resistance.

Moreover, at an inner peripheral portion of each clutch plate 104, an internal-gear-shaped spline is formed. Such an internal-gear-shaped spline is spline-fitted in a plate holding portion 105c formed at the center clutch 105 and a plate housing sub-portion 112b formed at the pressure clutch 112. The clutch plates 104 are formed to have the same size and shape for the center clutch 105 and the pressure clutch 112. Note that needless to say, the above-described friction member may be provided at the clutch plate 104 instead of the friction plate 103.

Figure 2:
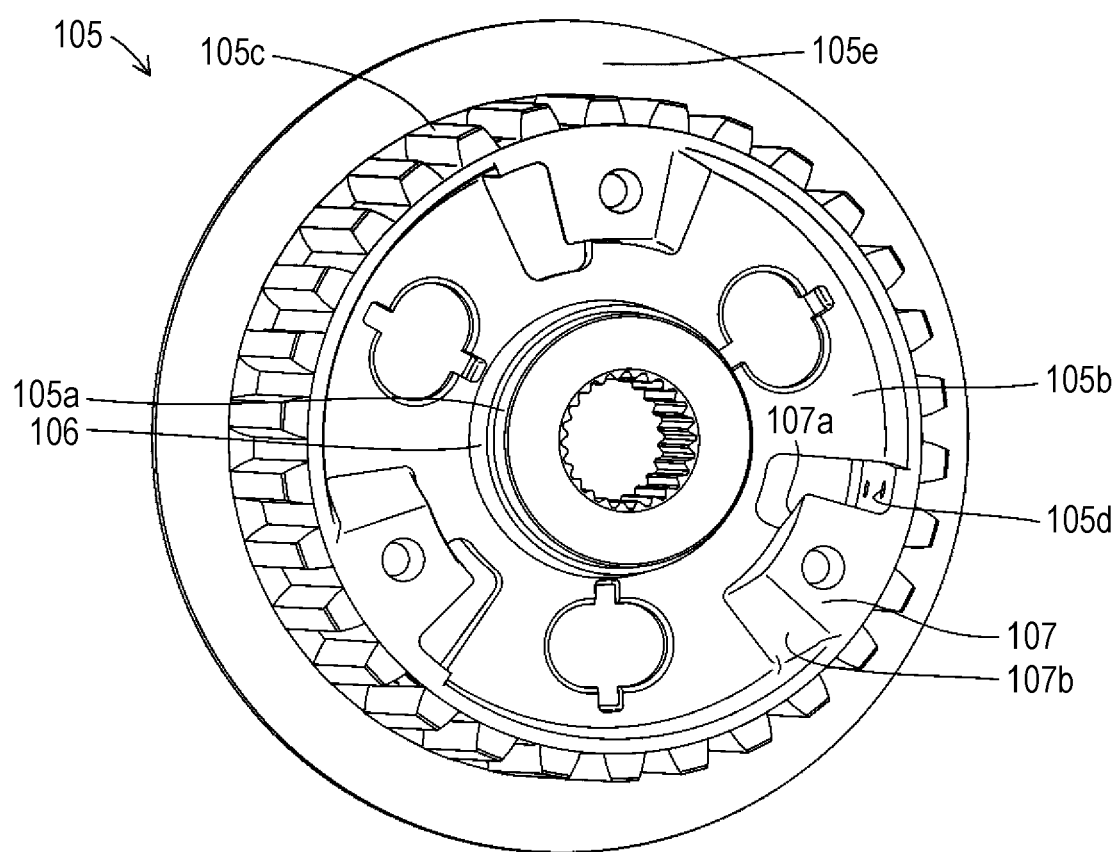
FIG. 2 is a perspective view schematically illustrating an external configuration of a center clutch incorporated in the clutch device illustrated in FIG. 1.
Figure 3:
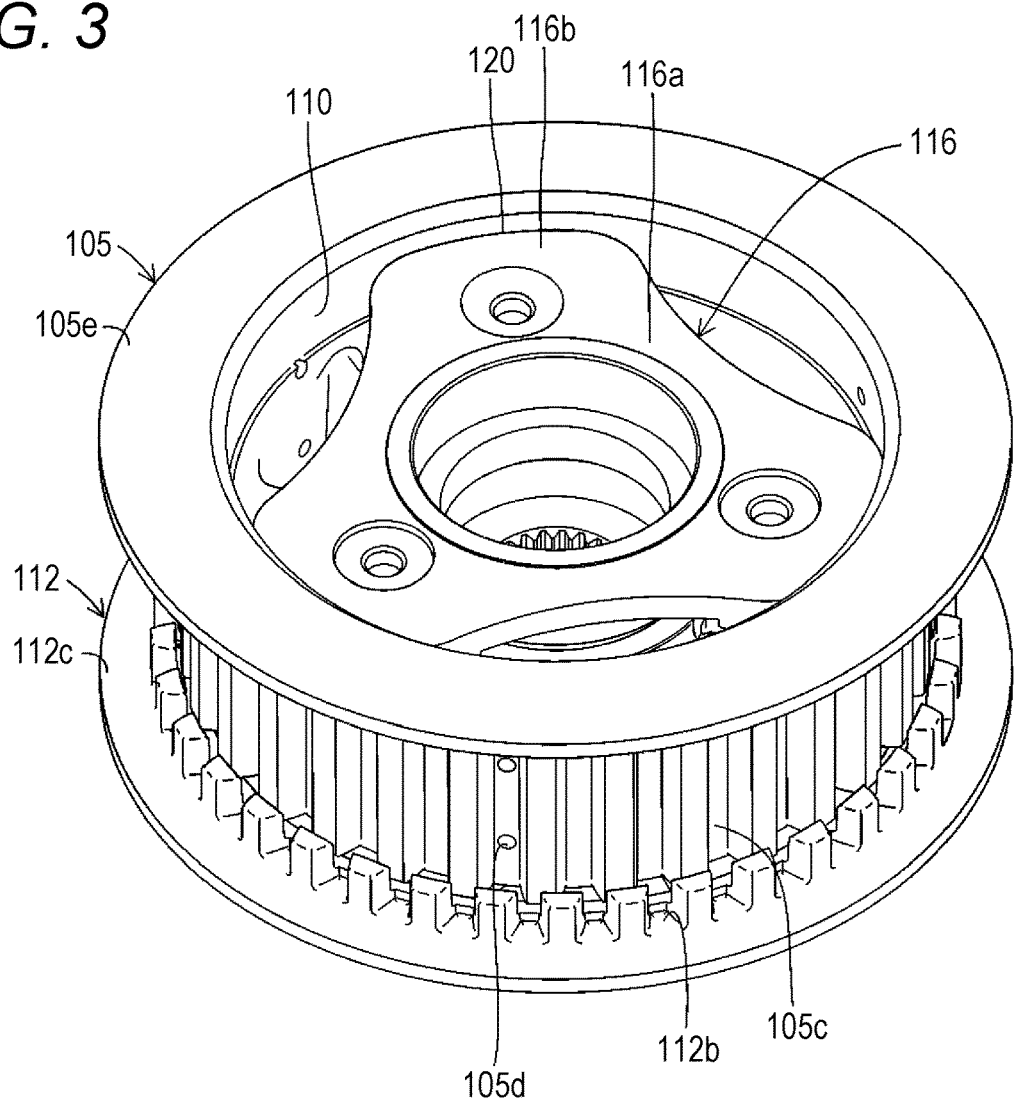
FIG. 3 is a perspective view schematically illustrating external configurations of the center clutch, a pressure clutch, and a lifter plate in an assembled state, the center clutch, the pressure clutch, and the lifter plate being incorporated into the clutch device illustrated in FIG. 1.

As illustrated in each of FIGS. 2 and 3, the center clutch 105 is a component for housing each of the clutch plates 104 and the pressure clutch 112 together with the clutch housing 101 and transmitting the drive force of the engine to a transmission side. The center clutch 105 is formed in such a manner that an aluminum alloy material is shaped into a substantially cylindrical shape. More specifically, the center clutch 105 is formed in such a manner that a shaft coupling portion 105a, a ring-shaped intermediate portion 105b, and the plate holding portion 105c are mainly integrally formed.

The shaft coupling portion 105a is a portion to be fitted in the pressure clutch 112 and to be coupled to the shaft 111. The shaft coupling portion 105a is formed in a cylindrical shape extending in an axial direction at a center portion of the center clutch 105. At an inner peripheral surface of the shaft coupling portion 105a, an internal-gear-shaped spline is formed along an axis line direction of the center clutch 105. The shaft 111 is spline-fitted in such a spline. That is, the center clutch 105 rotates integrally with the shaft 111 at a position concentric with the clutch housing 101 and the shaft 111.

Moreover, a pressure clutch slide portion 106 is formed at a center portion in the axial direction on an outer peripheral surface of the shaft coupling portion 105a. The pressure clutch slide portion 106 is a portion onto which a second center clutch slide portion 113 of the pressure clutch 112 is fitted and on which the second center clutch slide portion 113 slides in the axial direction. The pressure clutch slide portion 106 is formed in a cylindrical shape. The pressure clutch slide portion 106 is formed at the same position in the axial direction as that of a later-described center-side cam portion 107, i.e., at a position inside the center-side cam portion 107 in a radial direction. Moreover, the length of the pressure clutch slide portion 106 in the axial direction is slightly longer than the stroke of the pressure clutch 112 in the axial direction.

The ring-shaped intermediate portion 105b is a portion formed between the shaft coupling portion 105a and the plate holding portion 105c. The ring-shaped intermediate portion 105b is configured such that each of three support rod through-holes 108 is formed between adjacent ones of three center-side cam portions 107 arranged in a circumferential direction. Three center-side cam portions 107 are raised portions forming center-side assist cam surfaces 107a and center-side slipper cam surfaces 107b. Three center-side cam portions 107 are formed to extend along the circumferential direction of the center clutch 105.

In this case, three center-side cam portions 107 are equally formed along the circumferential direction of the center clutch 105. Moreover, each center-side cam portion 107 is formed such that an inner peripheral portion thereof is connected integrally with the shaft coupling portion 105a. Further, the center-side assist cam surface 107a and the center-side slipper cam surface 107b are each formed at both end portions of each center-side cam portion 107 in the circumferential direction of the center clutch 105.

Each center-side assist cam surface 107a is a portion for generating, in cooperation with a later-described pressure-side assist cam surface 114a, assist torque as force for enhancing pressure contact force between the friction plate 103 and the clutch plate 104. Each center-side assist cam surface 107a is configured as an inclined surface gradually projecting to a pressure clutch 112 side along the circumferential direction of the center clutch 105. In this case, each center-side assist cam surface 107*a* is formed in a direction facing the support rod through-hole 108.

Each center-side slipper cam surface 107*b* is a portion for generating, in cooperation with a later-described pressure-side slipper cam surface 114*b*, slipper torque as force for promptly separating the friction plate 103 and the clutch plate 104 to bring these plates into a half-clutch state. Each center-side slipper cam surface 107*b* is, on the side opposite to the center-side assist cam surface 107*a* in the circumferential direction, configured as an inclined surface inclined in the same direction as that of the center-side assist cam surface 107*a*.

In this case, each center-side slipper cam surface 107*b* is formed in a direction facing the pressure clutch 112 side on the side opposite to the center-side assist cam surface 107*a*. Moreover, each center-side slipper cam surface 107*b* is formed to have the same length as the length of extension of the center-side assist cam surface 107*a* in the radial direction. That is, each center-side slipper cam surface 107*b* is formed to have the same area as the area of the center-side assist cam surface 107*a* at the same position in the radial direction as the formation position of the center-side assist cam surface 107*a*.

Note that each center-side slipper cam surface 107*b* may be formed to have an area different from the area of the center-side assist cam surface 107*a* at a position (a position shifted in the radial direction) different from the formation position of the center-side assist cam surface 107*a* in the radial direction. Moreover, the above-described half-clutch state of the clutch device 100 means an incomplete transmission state, and in this state, part of the drive force of the engine is transmitted to a drive wheel side in a state before the friction plates 103 and the clutch plates 104 in the clutch device 100 are fully in close contact with each other.

Three support rod through-holes 108 are through-holes for penetration of later-described three tubular support rods 115. These three support rod through-holes 108 are equally formed at positions among three center-side cam portions 107 along the circumferential direction of the center clutch 105.

The plate holding portion 105*c* is a portion configured to hold part of the multiple clutch plates 104 together with the friction plates 103. The plate holding portion 105*c* is formed to have a cylindrical shape extending in the axial direction at an outer edge portion of the center clutch 105. The outer peripheral portion of the plate holding portion 105*c* includes an external-gear-shaped spline. The plate holding portion 105*c* holds the clutch plates 104 and the friction plates 103 in a state in which these plates are alternately arranged, are displaceable along the axis line direction of the center clutch 105, and are rotatable integrally with the center clutch 105. At the plate holding portion 105*c*, oil holes 105*d* as through-holes for guiding the clutch oil from the inside to the outside of the plate holding portion 105*c* in the radial direction are intermittently formed along the axial direction.

Moreover, a plate receiving portion 105*e* is formed at a tip end portion of the plate holding portion 105*c*. The plate receiving portion 105*e* is a portion configured to receive the clutch plates 104 and the friction plates 103 pressed by the pressure clutch 112 such that these plates are sandwiched between the plate receiving portion 105*e* and the pressure clutch 112. The plate receiving portion 105*e* is formed such that the tip end portion of the plate holding portion 105*c* formed in the cylindrical shape projects outwardly in the radial direction in a flange shape. Moreover, a lifter plate slide portion 110 is formed at an inner peripheral surface of the plate holding portion 105*c*, which is formed in the cylindrical shape, in the radial direction.

The lifter plate slide portion 110 is a portion on which a lifter plate 116 reciprocatably slides in the axial direction. The lifter plate slide portion 110 is formed by the inner peripheral surface of the plate holding portion 105*c* formed in the cylindrical shape. The lifter plate slide portion 110 is, at an end portion of the plate holding portion 105*c* on a plate receiving portion 105*e* side, formed to have a slightly longer length than the stroke of the lifter plate 116 in the axial direction.

The shaft 111 is a shaft body formed in a hollow shape. Of the shaft 111, one end side (the right side as viewed in the figure) rotatably supports the input gear 102 and the clutch housing 101 through the bearing (not shown), and supports the spline-fitted center clutch 105 in a fixed manner through a nut (not shown). Of the shaft 111, the other end portion (the outer left side as viewed in the figure) is coupled to the transmission (not shown) of the two-wheel motor vehicle. That is, the shaft 111 is equivalent to a driven shaft of the present invention. Note that in FIG. 1, the shaft 111 is indicated by a chain double-dashed line.

Figure 4:
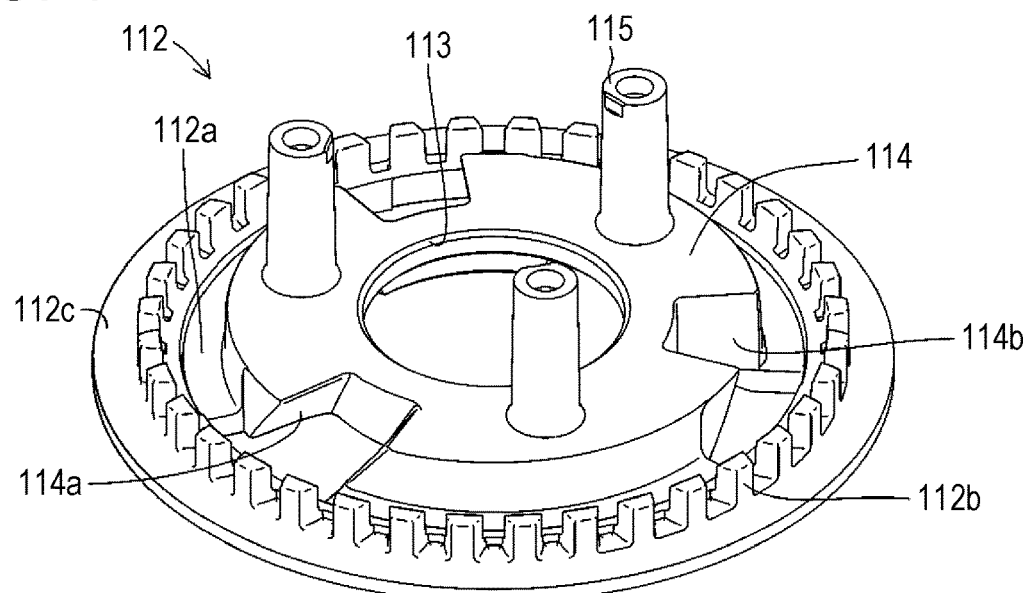
FIG. 4 is a perspective view schematically illustrating an external configuration of the pressure clutch incorporated into the clutch device illustrated in FIG. 1.

As illustrated in FIG. 4, the pressure clutch 112 is a component for pressing the friction plates 103 to cause the friction plates 103 and the clutch plates 104 to closely contact each other. The pressure clutch 112 is formed in such a manner that an aluminum alloy material is shaped into a substantially discoid shape having the substantially same outer diameter size as the outer diameter of the clutch plate 104. More specifically, the pressure clutch 112 is, as illustrated in FIG. 4, mainly formed in such a manner that a ring-shaped intermediate portion 112*a* and the plate housing sub-portion 112*b* are integrally formed.

The ring-shaped intermediate portion 112*a* is formed in a ring shape with a raised-recessed portion. The ring-shaped intermediate portion 112*a* is configured such that intermediate portions of three pressure-side cam portions 114 arranged on the circumference of such a ring body each have three tubular support rods 115. The ring-shaped intermediate portion 112*a* is slidably fitted onto the outer peripheral surface of the shaft coupling portion 105*a* of the center clutch 105. More specifically, the second center clutch slide portion 113 formed by an inner peripheral surface of a through-hole formed at a center portion is, at the ring-shaped intermediate portion 112*a*, slidably fitted onto the pressure clutch slide portion 106 formed at the outer peripheral surface of the shaft coupling portion 105*a*.

With this configuration, the pressure clutch 112 is rotatably provided independently of the center clutch 105 and the shaft 111 at a position concentric with the clutch housing 101, the center clutch 105, and the shaft 111. The second center clutch slide portion 113 is a portion configured to allow tilting of the pressure clutch 112 with respect to the axial direction while guiding the pressure clutch 112 in the axial direction. The length of the second center clutch slide portion 113 in the axial direction is shorter than the length of a later-described first center clutch slide portion 120 in the axial direction.

Figure 5:
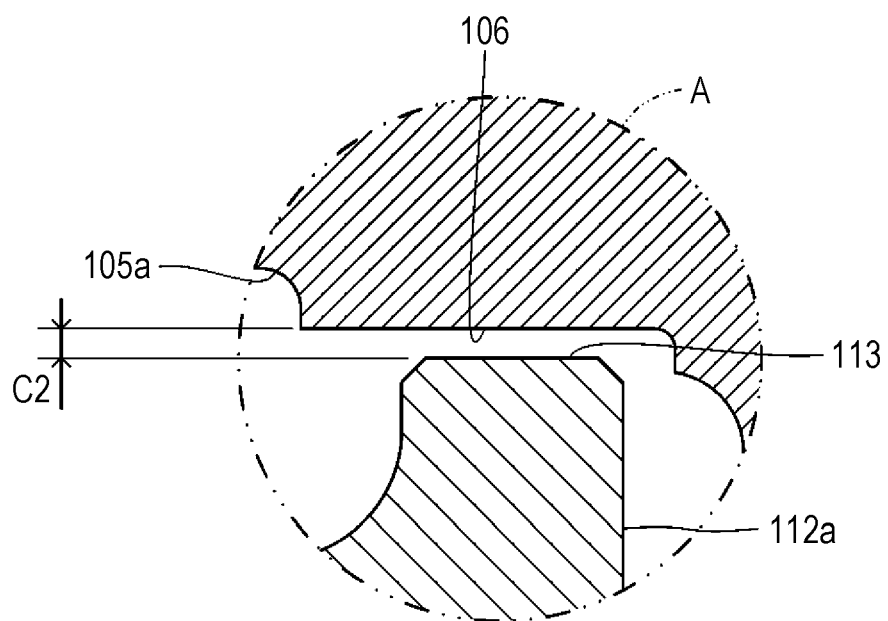
FIG. 5 is a partially-enlarged view illustrating a configuration in a dashed circle A illustrated in FIG. 1 in closeup.

A clearance C2 as a clearance between the second center clutch slide portion 113 and the pressure clutch slide portion 106 is, as illustrated in FIG. 5, set to such an amount that tilting of the pressure clutch 112 with respect to the axial direction when the pressure clutch 112 reciprocatably slides in the axial direction is allowed. In tilting of the pressure clutch 112 in this case, smooth reciprocatable slide of the pressure clutch 112 in the axial direction is ensured. Further, in such tilting of the pressure clutch 112, when the center-side cam portions 107 and the pressure-side cam portions 114 slide in contact with each other, cam surfaces of the pressure-side cam portions 114 and cam surfaces of the center-side cam portions 107 are brought into or come close to a parallel state, and therefore, are ideally brought into or come close to a surface contact state across the entire surface.

The clearance C2 may be set to equal to or greater than three times and equal to or less than ten times as great as a later-described clearance C1, and may be more preferably set to equal to or greater than four times and equal to or less than seven times. In this case, the clearance C2 may be set within a range of 0.1 mm to 0.5 mm. In the present embodiment, the clearance C2 is set to 0.2 mm.

Three pressure-side cam portions 114 are raised portions forming the pressure-side assist cam surfaces 114a and the pressure-side slipper cam surfaces 114b. Three pressure-side cam portions 114 are formed to extend along the circumferential direction of the pressure clutch 112. In this case, three pressure-side cam portions 114 are equally formed along the circumferential direction of the pressure clutch 112. Moreover, each pressure-side cam portion 114 is formed such that an outer peripheral portion thereof is connected integrally with the plate housing sub-portion 112b. Further, the pressure-side assist cam surface 114a and the pressure-side slipper cam surface 114b are each formed at both end portions of each pressure-side cam portion 114 in the circumferential direction of the pressure clutch 112.

Each pressure-side assist cam surface 114a is a portion configured to slide on the center-side assist cam surface 107a of the center clutch 105. Each pressure-side assist cam surface 114a is configured as an inclined surface gradually projecting to a center clutch 105 side along the circumferential direction of the pressure clutch 112. That is, the center-side assist cam surfaces 107a and the pressure-side assist cam surfaces 114a form an assist mechanism.

Each pressure-side slipper cam surface 114b is a portion configured to slide on the center-side slipper cam surface 107b. Each pressure-side slipper cam surface 114b is configured as an inclined surface extending in the same direction as that of the pressure-side assist cam surface 114a on the side opposite to the pressure-side assist cam surface 114a in the circumferential direction. That is, the center-side slipper cam surfaces 107b and the pressure-side slipper cam surfaces 114b form a slipper mechanism.

Each pressure-side slipper cam surface 114b is formed to have the same length and area as the length and area of the pressure-side assist cam surface 114a in the radial direction. That is, each pressure-side slipper cam surface 114b is formed to have the same area as the area of the center-side slipper cam surface 107b at a position facing the center-side slipper cam surface 107b. Note that each pressure-side slipper cam surface 114b may be formed to have an area different from the area of the pressure-side assist cam surface 114a at a position (a position shifted in the radial direction) different from the formation position of the pressure-side assist cam surface 114a in the radial direction.

Three tubular support rods 115 are cylindrical portions extending in a columnar shape in the axial direction of the center clutch 105 to support the lifter plate 116, and at inner peripheral portions thereof, are provided with internal threads. Three tubular support rods 115 are equally formed along the circumferential direction of the pressure clutch 112.

The plate housing sub-portion 112b is a portion configured to hold the other part of the multiple clutch plates 104 together with the friction plates 103. The plate housing sub-portion 112b is, at an outer edge portion of the pressure clutch 112, formed to have a cylindrical shape extending in the axial direction. An outer peripheral portion of the plate housing sub-portion 112b includes an external-gear-shaped spline. The plate housing sub-portion 112b holds the clutch plates 104 and the friction plates 103 in a state in which these plates are alternately arranged, are displaceable along an axis line direction of the pressure clutch 112, and are rotatable integrally with the pressure clutch 112. In this case, the plate housing sub-portion 112b is formed to have a greater inner diameter than that of the plate holding portion 105c of the center clutch 105. The plate housing sub-portion 112b is configured fittable onto the plate holding portion 105c in a non-contact state. A plate pressing portion 112c is formed at a tip end portion of the plate housing sub-portion 112b.

The plate pressing portion 112c is a portion for pressing the clutch plates 104 and the friction plates 103 held on the plate holding portion 105c toward the plate receiving portion 105e side such that the clutch plates 104 and the friction plates 103 closely contact each other with high pressure. The plate pressing portion 112c is formed such that a base portion of the plate housing sub-portion 112b formed in the cylindrical shape projects outwardly in the radial direction in a flange shape.

Figure 6:
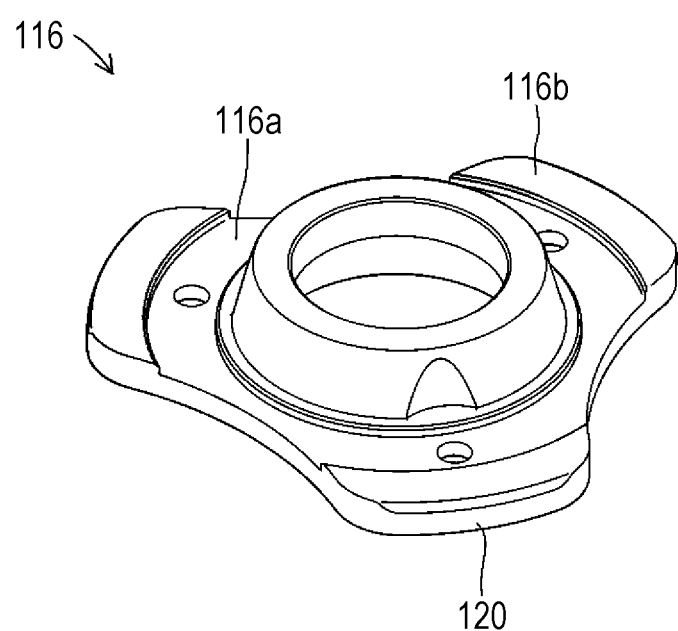
FIG. 6 is a perspective view schematically illustrating an external configuration of the lifter plate incorporated into the clutch device illustrated in FIG. 1.

As illustrated in FIG. 6, the lifter plate 116 is a component for reciprocatably displacing the pressure clutch 112 in the axial direction, and is formed in such a manner that a metal material is formed into a cylindrical shape. More specifically, the lifter plate 116 mainly includes each of an operation receiving portion 116a and projecting portions 116b. The operation receiving portion 116a is a portion to be pressed by a clutch release mechanism through a release pin 117. The operation receiving portion 116a is formed to have a cylindrical shape housing the bearing pressed by the release pin 117. Here, the clutch release mechanism is a mechanical device configured to press the release pin 117 to a shaft 111 side according to operation of a clutch operation lever (not shown) by a driver of a self-propelled vehicle on which the clutch device 100 is mounted. Note that in FIG. 1, the release pin 117 is indicated by a chain double-dashed line.

The projecting portion 116b is a portion configured such that a clutch spring 118 is sandwiched between the projecting portion 116b and the ring-shaped intermediate portion 105b of the center clutch 105 and configured to guide the lifter plate 116 in the axial direction. The projecting portion 116b is formed in a plate shape projecting outward of an outer peripheral portion of the operation receiving portion 116a in the radial direction. In this case, the projecting portions 116b are formed to project from three spots of the outer peripheral portion of the operation receiving portion 116a at equal intervals in the circumferential direction.

These projecting portions 116b are each attached to tip end portions of three tubular support rods 115 through attachment bolts in a state in which the ring-shaped intermediate portion 105b and the projecting portions 116b sandwich the clutch springs 118 on the opposite side of the center clutch 105 from the pressure clutch 112. That is, the lifter plate 116 displaces and rotates relative to the center clutch 105 integrally with the pressure clutch 112.

The clutch spring 118 is an elastic body for pressing the pressure clutch 112 to the center clutch 105 side to press the plate pressing portion 112c of the pressure clutch 112 against the friction plates 103. The clutch spring 118 includes a coil spring formed in such a manner that spring steel is wound in a spiral shape. The clutch spring 118 is arranged between adjacent ones of three tubular support rods 115. Moreover, the first center clutch slide portion 120 is formed at a tip end portion of each projecting portion 116b.

The first center clutch slide portion 120 is a portion for guiding the lifter plate 116 in the axial direction. The first center clutch slide portions 120 are formed to have a circumferential surface at outer peripheral surfaces of three projecting portions 116b. In this case, each first center clutch slide portion 120 is formed to have a greater thickness than that of an inner portion for pressing the clutch spring 118. Moreover, the length of the first center clutch slide portion 120 in the axial direction is longer than the length of the second center clutch slide portion 113 in the axial direction.

Figure 7:
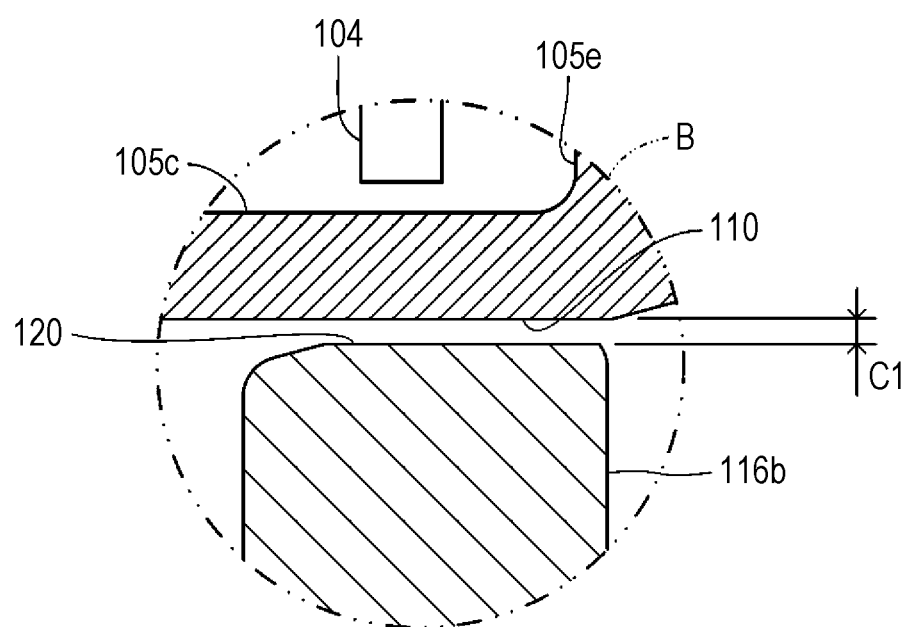
FIG. 7 is a partially-enlarged view illustrating a configuration in a dashed circle B illustrated in FIG. 1 in closeup.

Here, as illustrated in FIG. 7, the clearance C1 as a clearance between the first center clutch slide portion 120 and the lifter plate slide portion 110 is set to such an amount that when the lifter plate 116 reciprocatably slides in the axial direction, a change in the posture of the lifter plate 116 is suppressed while the lifter plate 116 is smoothly reciprocatably sliding. Specifically, the clearance C1 is set within a range of 0.01 mm to 0.08 mm. In the present embodiment, the clearance C1 is set to 0.02 mm.

The clutch device 100 is filled with a predetermined amount of clutch oil (not shown). The clutch oil is mainly supplied to among the friction plates 103 and the clutch plates 104 to absorb friction heat generated thereamong and prevent abrasion of the friction members. That is, the clutch device 100 is a so-called wet multiplate friction clutch device.

Actuation of Clutch Device 100

Next, actuation of the clutch device 100 configured as described above will be described. As described above, the clutch device 100 is arranged between the engine and the transmission in the vehicle. The clutch device 100 performs, according to operation of the clutch operation lever by the driver of the vehicle, transmission of the drive force of the engine to the transmission and blocking of such transmission.

Figure 8:
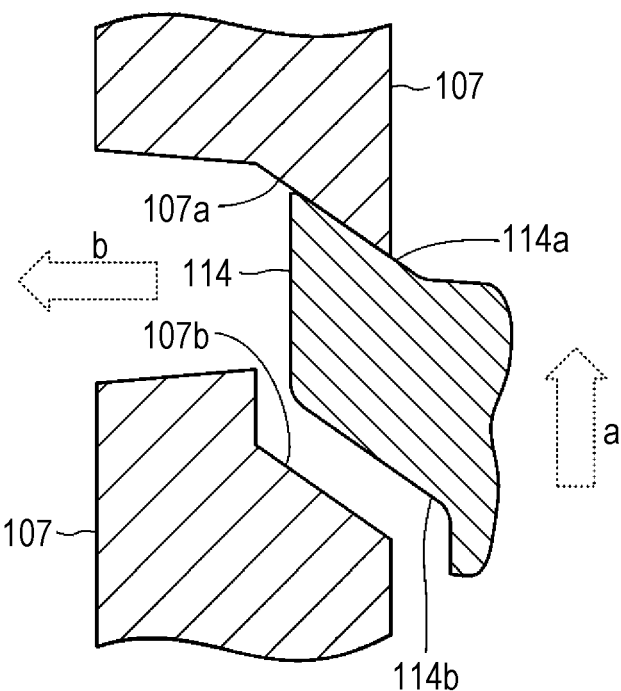
FIGS. 8(A) and 8(B) illustrate a cam surface actuation state in the clutch device illustrated in FIG. 1, FIG. 8(A) being a sectional view schematically illustrating a state in which a pressure-side assist cam surface moves over a center-side assist cam surface, FIG. 8(B) being a sectional view schematically illustrating a state in which a pressure-side slipper cam surface moves over a center-side slipper cam surface.
Figure 8:
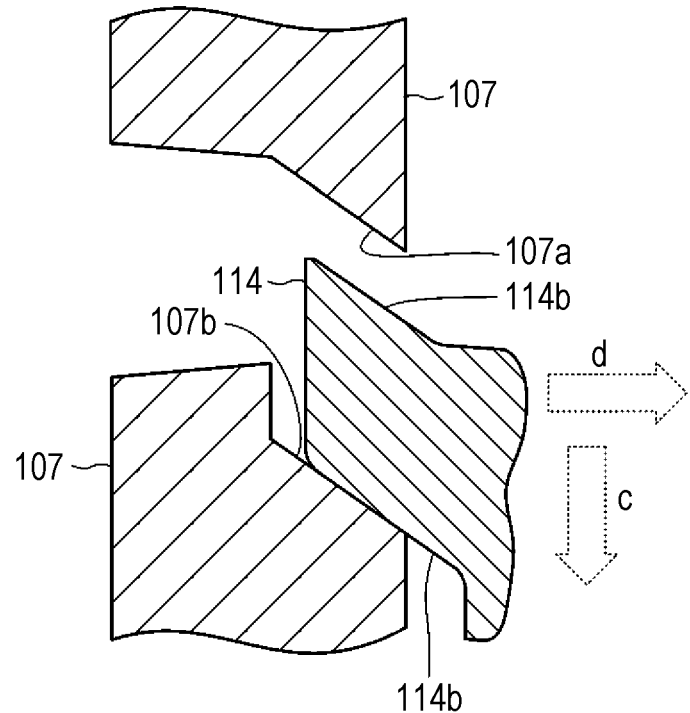

Specifically, as illustrated in each of FIGS. 1 and 8(A), in the clutch device 100, in a case where the driver (not shown) of the vehicle does not operate the clutch operation lever (not shown), the clutch release mechanism (not shown) does not press the release pin 117, and therefore, the pressure clutch 112 presses the friction plates 103 by elastic force of the clutch springs 118. Thus, the friction plates 103 and the clutch plates 104 are brought into a clutch ON state in which these plates are pressed against each other and are friction-coupled to each other, and the center clutch 105 is rotatably driven. That is, rotary drive force of the motor is transmitted to the center clutch 105, and in this manner, the shaft 111 is rotatably driven.

In such a clutch ON state, the pressure clutch 112 displaces (a b-arrow in the figure) in the direction of approaching the center clutch 105 while rotating relative to the center clutch 105 by cam action (an a-arrow in the figure) in which the pressure-side assist cam surface 114a formed at the pressure clutch 112 moves over the center-side assist cam surface 107a formed at the center clutch 105. This leads to action of the assist function of rapidly enhancing pressing force. Accordingly, the pressure clutch 112 is pressed against the center clutch 105 with strong force by the assist mechanism.

In the course of action of the assist function of causing the center-side assist cam surface 107a and the pressure-side assist cam surface 114a to closely contact each other with strong pressure, in a case where the center-side assist cam surface 107a and the pressure-side assist cam surface 114a are not parallel with each other, but the pressure-side assist cam surface 114a tilts with respect to the center-side assist cam surface 107a, the entirety of the pressure clutch 112 is inclined such that the pressure-side assist cam surface 114a is along the center-side assist cam surface 107a.

This is because the clearance C2 is provided between the pressure clutch slide portion 106 of the center clutch 105 and the second center clutch slide portion 113 of the pressure clutch 112 and a second center clutch slide portion 113 side of the pressure clutch 112 is tiltably supported. With this configuration, the center-side assist cam surface 107a and the pressure-side assist cam surface 114a are brought into or come close to the parallel state, and therefore, the cam surfaces thereof are brought into or come close to the surface contact state across the entire surface. Thus, efficient torque transmission is performed.

Moreover, in this clutch ON state, in a case where the number of rotations of the drive wheel side exceeds the number of rotations of an engine side due to, e.g., shift down operation for the transmission by the driver, back torque might act on the clutch device 100 because the number of rotations of the shaft 111 exceeds the number of rotations of the input gear 102. In this case, in the clutch device 100, the pressure clutch 112 displaces (a d-arrow in the figure) in the direction of separating from the center clutch 105 while rotating relative to the center clutch 105 by cam action (a c-arrow in the figure) in which the pressure-side slipper cam surface 114b formed at the pressure clutch 112 moves over the center-side slipper cam surface 107b formed at the center clutch 105, as illustrated in FIG. 8(B). This leads to action of the slipper function of rapidly weakening the pressing force. Thus, in the clutch device 100, the friction plates 103 and the clutch plates 104 start separating from each other. Accordingly, a state in which these plates are pressed against each other is weakened, and a state in which friction coupling is weakened is brought.

In the course of action of the slipper function of causing the center-side slipper cam surface 107b and the pressure-side slipper cam surface 114b to closely contact each other with strong pressure, in a case where the center-side slipper cam surface 107b and the pressure-side slipper cam surface 114b are not parallel with each other, but the pressure-side slipper cam surface 114b tilts with respect to the center-side slipper cam surface 107b, the entirety of the pressure clutch 112 is, as in a case where the assist function acts, inclined such that the pressure-side slipper cam surface 114b is along the center-side slipper cam surface 107b. With this configuration, the center-side slipper cam surface 107b and the pressure-side slipper cam surface 114b are brought into or come close to the parallel state, and therefore, the cam surfaces thereof are brought into or come close to the surface contact state across the entire surface. Thus, efficient torque transmission is performed.

Figure 9:
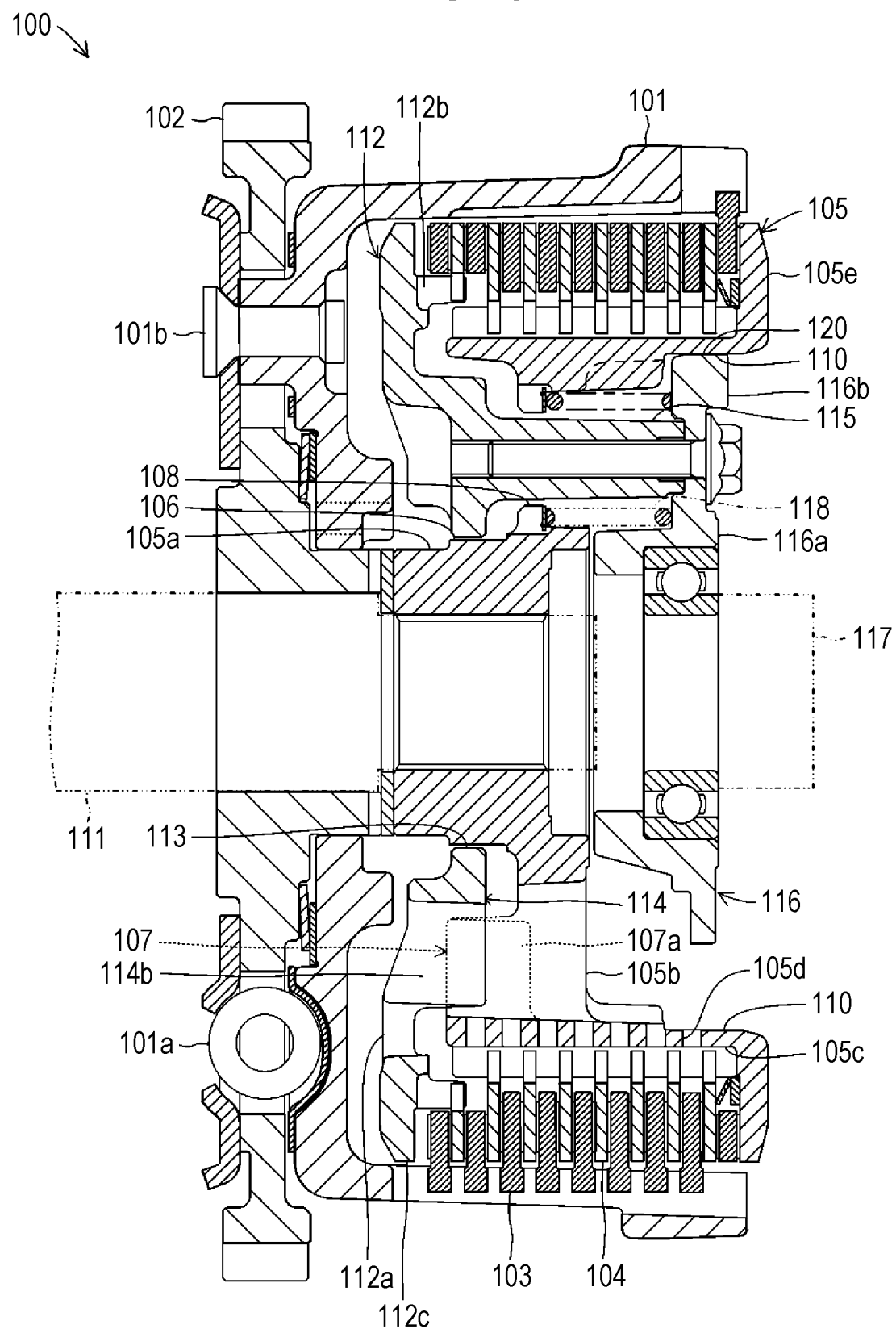
FIG. 9 is a sectional view illustrating a clutch OFF state in the clutch device illustrated in FIG. 1.

On the other hand, in the clutch device 100, in a case where the driver of the vehicle has operated the clutch operation lever in the clutch ON state, the clutch release mechanism (not shown) presses the release pin 117 as illustrated in FIG. 9. Thus, the pressure clutch 112 displaces in the direction of separating from the center clutch 105 against the elastic force of the clutch springs 118. In this case, the first center clutch slide portions 120 of the lifter plate 116 slide on the lifter plate slide portion 110 of the center clutch 105 through the clearance C1, and therefore, the pressure clutch 112 is smoothly and stably guided along the axial direction of the center clutch 105.

Accordingly, the center clutch 105 is brought into a clutch OFF state in which friction coupling among the friction plates 103 and the clutch plates 104 is cancelled. Thus, a state in which rotary drive is attenuated or stopped is brought. That is, the rotary drive force of the motor is blocked from the center clutch 105. In this case, the center-side assist cam surface 107a and the pressure-side assist cam surface 114a are in a separate state, and the center-side slipper cam surface 107b and the pressure-side slipper cam surface 114b are in a separate state. Thus, each of the assist torque and the slipper torque is not generated.

In a case where the driver releases the clutch operation lever in the clutch OFF state, pressing of the lifter plate 116 by the clutch release mechanism (not shown) through the release pin 117 is cancelled. Thus, the pressure clutch 112 displaces in the direction of approaching the center clutch 105 by the elastic force of the clutch springs 118. In this case, the first center clutch slide portions 120 of the lifter plate 116 slide on the lifter plate slide portion 110 of the center clutch 105 through the clearance C1, and therefore, the pressure clutch 112 is smoothly and stably guided along the axial direction of the center clutch 105.

In the course of transition from the clutch OFF state to the clutch ON state, in a case where relative rotation between the center clutch 105 and the pressure clutch 112 is caused, the assist function acts. In this case, if the pressure-side assist cam surface 114a tilts with respect to the center-side assist cam surface 107a when the pressure-side assist cam surface 114a contacts the center-side assist cam surface 107a, the entirety of the pressure clutch 112 is, as in action of the assist function, inclined such that the pressure-side assist cam surface 114a is along the center-side assist cam surface 107a. Thus, the center-side assist cam surface 107a and the pressure-side assist cam surface 114a are brought into or come close to the parallel state, and therefore, the cam surfaces thereof are brought into or come close to the surface contact state across the entire surface. Thus, efficient torque transmission is performed.

As can be understood from actuation description above, according to the above-described embodiment, in the clutch device 100, the clearance C2 between the second center clutch slide portion 113 and the pressure clutch slide portion 106 sliding on each other in the vicinity of the center-side cam portions 107 and the pressure-side cam portions 114 is set to a greater value than the clearance C1 between each first center clutch slide portion 120 and the lifter plate slide portion 110 sliding on each other at a position apart from each of these cam portions. Thus, in the clutch device 100, the first center clutch slide portions 120 slide on the lifter plate slide portion 110. Consequently, the pressure clutch 112 can be guided on the same axis as that of the center clutch 105, a change in tilting of the pressure clutch 112 can be accepted by the clearance C2 between the second center clutch slide portion 113 and the pressure clutch slide portion 106, and the pressure-side cam portions 114 of the pressure clutch 112 can slide in close contact with the center-side cam portions 107 of the center clutch 105. With this configuration, the clutch device 100 can improve close contactability between the center-side cam portion 107 of the center clutch 105 and the pressure-side cam portion 114 of the pressure clutch 112, and can stabilize torque transmission.

Further, implementation of the present invention is not limited to the above-described embodiment, and various changes can be made without departing from the object of the present invention. Note that in each variation described below, the same reference numerals as or corresponding reference numerals to those assigned to the clutch device 100 are used to represent components similar to those of the clutch device 100 in the above-described embodiment, and description thereof will be omitted as necessary.

For example, in the above-described embodiment, the clutch device 100 is configured such that the center-side cam portion 107 includes the center-side assist cam surface 107a and the center-side slipper cam surface 107b and the pressure-side cam portion 114 includes the pressure-side assist cam surface 114a and the pressure-side slipper cam surface 114b. That is, the center-side cam portion 107 and the pressure-side cam portion 114 are equivalent to a cam portion according to the present invention. However, each of the center-side cam portion 107 and the pressure-side cam portion 114 may include at least one of the assist-side cam surface and the slipper-side cam surface.

Moreover, in the above-described embodiment, the lifter plate slide portion 110 is formed at an inner surface of the plate holding portion 105c in the radial direction. Thus, the lifter plate 116 slides at a position facing the inside of the plate holding portion 105c in the radial direction. With this configuration, slidability is improved by the clutch oil supplied to the friction plates 103 and the clutch plates 104 through the oil holes 105d to cool these plates. However, the lifter plate slide portion 110 may be formed at an inner surface of the plate receiving portion 105e in the radial direction, and may be configured such that the lifter plate 116 slides on such a portion. In this case, the plate receiving portion 105e may be formed to have a thickness (a length in the axial direction) of equal to or greater than the stroke of the lifter plate 116. According to such a configuration, the lifter plate 116 can stably slide by the thick plate receiving portion 105e.

Further, in the above-described embodiment, the first center clutch slide portion 120 is formed such that the length of the shaft 111 in the axial direction is longer than that of the second center clutch slide portion 113. Thus, the clutch device 100 can reciprocatably slide, with favorable accuracy, the pressure clutch 112 in the axial direction of the center clutch 105. However, in the clutch device 100, the length of the shaft 111 in the axial direction at the first center clutch slide portion 120 may be shorter than that of the second center clutch slide portion 113 so that the acceptable amount of tilting of the pressure clutch 112 can be increased. Note that needless to say, the length of the shaft 111 in the axial direction may be, at the first center clutch slide portion 120, the same as the length of the second center clutch slide portion 113.

In addition, in the above-described embodiment, the second center clutch slide portion 113 is formed at the position overlapping with the pressure-side cam portions 114 in the axial direction of the shaft 111, i.e., formed inside the pressure-side cam portions 114 in the radial direction. Thus, in the clutch device 100, the amount of tilting of the pressure clutch 112 can be easily defined by the clearance C2 between the second center clutch slide portion 113 and the pressure clutch slide portion 106.

Figure 10:
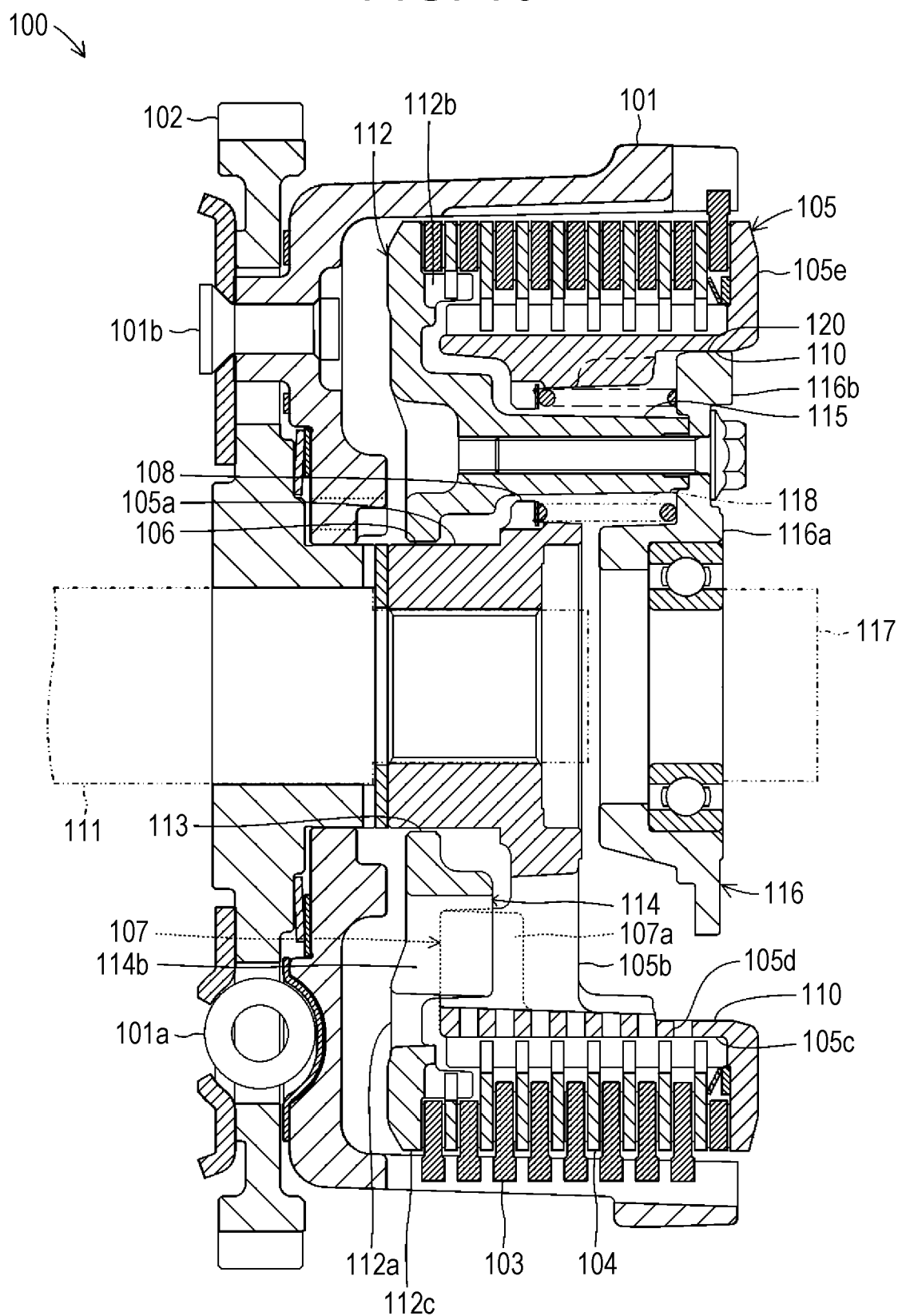
FIG. 10 is a sectional view illustrating the outline of an entire configuration of a clutch device according to a variation of the present invention, the clutch device being in a clutch ON state.

However, as illustrated in FIG. 10, the second center clutch slide portion 113 may be also formed at a position not overlapping with the pressure-side cam portions 114 on the side opposite to a first center clutch slide portion 120 side in the axial direction of the shaft 111. According to such a configuration, in the clutch device 100, a distance between the first center clutch slide portion 120 and the second center clutch slide portion 113 is further increased. Thus, the amount of tilting of the pressure clutch 112 can be more finely defined, and therefore, can be easily defined with high accuracy.

Moreover, in the above-described embodiment, the first center clutch slide portions 120 are each formed at three projecting portions 116b of the lifter plate 116. However, four or more projecting portions 116b may be provided, and the first center clutch slide portions 120 may be formed on the outer peripheral surfaces of these projecting portions 116b. Alternatively, the projecting portion 116b may be formed in a discoid shape connected as one, and the first center clutch slide portion 120 may be formed at an outer peripheral surface of such a discoid body.

Further, in the above-described embodiment, the second center clutch slide portion 113 is formed as the circumferential surface continuous to an inner peripheral surface of the ring-shaped intermediate portion 112a. However, one or more projecting portions projecting inwardly in the radial direction may be provided on the inner peripheral surface of the ring-shaped intermediate portion 112a, and the second center clutch slide portion 113 may be formed in an arc shape at inner peripheral surfaces of such projecting portions.

LIST OF REFERENCE SIGNS

C1 Clearance between first center clutch slide portion and lifter plate slide portion
C2 Clearance between second center clutch slide portion and pressure clutch slide portion
100 Clutch device
101 Clutch housing
101a Torque damper
101b Rivet
102 Input gear
103 Friction plate
104 Clutch plate
105 Center clutch
105a Shaft coupling portion
105b Ring-shaped intermediate portion
105c Plate holding portion
105d Oil hole
105e Plate receiving portion
106 Pressure clutch slide portion
107 Center-side cam portion
107a Center-side assist cam surface
107b Center-side slipper cam surface
108 Support rod through-hole
110 Lifter plate slide portion
111 Shaft
112 Pressure clutch
112a Ring-shaped intermediate portion
112b Plate housing sub-portion
112c Plate pressing portion
113 Second center clutch slide portion
114 Pressure-side cam portion
114a Pressure-side assist cam surface
114b Pressure-side slipper cam surface
115 Tubular support rod
116 Lifter plate
116a Operation receiving portion
116b Projecting portion
117 Release pin
118 Clutch spring
120 First center clutch slide portion

The invention claimed is:

1. A clutch device for transmitting rotary drive force of a drive shaft to a driven shaft or blocking transmission, comprising:
   a center clutch holding a clutch plate arranged facing a friction plate to be rotatably driven by rotary drive of the drive shaft, coupled to the driven shaft, and rotatably driven together with the driven shaft; and
   a pressure clutch arranged facing the center clutch in a state in which the pressure clutch is able to approach or separate from the center clutch and is rotatable relative to the center clutch and elastically pressing the friction plate or the clutch plate;
   a cam portion provided at each of the center clutch and the pressure clutch and having a pair of cam surfaces for causing the pressure clutch to approach or separate from the center clutch to increase or decrease pressing force of the pressure clutch on the friction plate or the clutch plate upon relative rotation of the center clutch and the pressure clutch; and
   a lifter plate formed integrally with the pressure clutch and configured to transmit, to the pressure clutch, force of causing the pressure clutch to approach or separate from the center clutch, wherein
   the center clutch has each of a pressure clutch slide portion formed in a cylindrical shape on a cam surface formation side in an axial direction of the driven shaft and configured to slide the pressure clutch along the axial direction and a lifter plate slide portion formed in a cylindrical shape on a side opposite to a pressure clutch slide portion formation side in the axial direction and configured to slide the lifter plate along the axial direction,
   the lifter plate has a first center clutch slide portion configured to slide on the lifter plate slide portion,
   the pressure clutch has a second center clutch slide portion configured to slide on the pressure clutch slide portion, and
   a clearance between the second center clutch slide portion and the pressure clutch slide portion is set to a greater value than a clearance between the first center clutch slide portion and the lifter plate slide portion.

2. The clutch device according to claim 1, wherein the lifter plate slide portion is formed at an inner surface of a plate holding portion in a radial direction, the plate holding portion being formed in a cylindrical shape at the center clutch and holding the clutch plate.

3. The clutch device according to claim 1, wherein
   the center clutch has a plate receiving portion which is formed to project outwardly in a radial direction from a tip end portion of a plate holding portion formed in a cylindrical shape at the center clutch and holding the clutch plate and which is configured to receive the friction plate or the clutch plate pressed by the pressure clutch, and
   the lifter plate slide portion is formed at an inner surface of the plate receiving portion in the radial direction.

4. The clutch device according to claim 1, wherein the first center clutch slide portion is formed such that a length in the axial direction of the driven shaft is longer than that of the second center clutch slide portion.

5. The clutch device according to claim 1, wherein the second center clutch slide portion is formed at a position overlapping with the cam portion in the axial direction of the driven shaft.

* * * * *